United States Patent
Saitou et al.

(10) Patent No.: US 10,220,812 B2
(45) Date of Patent: Mar. 5, 2019

(54) BIOLOGICAL OBJECT DETECTOR, VEHICLE SEAT OCCUPANCY DETECTOR, AND SEAT BELT NON-WEARING WARNING SYSTEM

(71) Applicant: DENSO CORPORATION, Kariya, Aichi-pref. (JP)

(72) Inventors: Keita Saitou, Kariya (JP); Yoshihiko Shiraishi, Kariya (JP); Yoshitaro Yazaki, Kariya (JP); Yasuhiro Tanaka, Kariya (JP); Eijirou Miyagawa, Kariya (JP); Motoki Shimizu, Kariya (JP); Toshikazu Harada, Kariya (JP); Atusi Sakaida, Kariya (JP); Toshihisa Taniguchi, Kariya (JP); Norio Gouko, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/657,358

(22) Filed: Jul. 24, 2017

(65) Prior Publication Data
US 2017/0320463 A1 Nov. 9, 2017

Related U.S. Application Data

(62) Division of application No. 14/896,005, filed as application No. PCT/JP2014/063709 on May 23, 2014.

(30) Foreign Application Priority Data

Jun. 4, 2013 (JP) .................................. 2013-117754
Oct. 23, 2013 (JP) .................................. 2013-220112

(51) Int. Cl.
*B60R 22/48* (2006.01)
*B60R 21/015* (2006.01)
(Continued)

(52) U.S. Cl.
CPC .............. *B60R 22/48* (2013.01); *B60N 2/002* (2013.01); *B60R 21/01512* (2014.10);
(Continued)

(58) Field of Classification Search
CPC .. G01K 17/00; G01K 17/08; B60R 21/01512; B60R 21/015
See application file for complete search history.

(56) References Cited

U.S. PATENT DOCUMENTS

| | | | |
|---|---|---|---|
| 4,197,738 A | 4/1980 | Degenne | |
| 5,404,128 A | 4/1995 | Ogino et al. | |
| 2015/0144171 A1 | 5/2015 | Taniguchi et al. | |

FOREIGN PATENT DOCUMENTS

| | | |
|---|---|---|
| JP | S62096831 A | 5/1987 |
| KR | 960012786 B1 | 9/1996 |

OTHER PUBLICATIONS

"Recognizing Human Activities from Accelerometer and Physiological Sensors", Sung-Ihk Yang et al, Proceedings of IEEE International Conference on Multisensor Fusion and Integration for Intelligent Systems, p. 100-105.

*Primary Examiner* — Hongmin Fan
(74) *Attorney, Agent, or Firm* — Harness, Dickey & Pierce, P.L.C.

(57) ABSTRACT

A heat flux sensor is installed in such a way that heat flux emanating from a biological object present at a predetermined position is detectable. It is determined whether or not a biological object is present at the predetermined position by comparing sensing results of the heat flux sensor with determination criteria. The determination criteria is preset according to heat flux that can be sensed when a biological object is present at the predetermined position. When the sensing results of the heat flux sensor satisfy the determination criteria, in other words, when the heat flux sensed by the heat flux sensor is the heat flux emanating from a (Continued)

biological object, it is determined that a biological object is present at the predetermined position. Consequently, it is possible to realize accurate detection of a biological object.

3 Claims, 8 Drawing Sheets

(51) Int. Cl.
*G01V 9/00* (2006.01)
*G01K 17/00* (2006.01)
*G01K 17/20* (2006.01)
*B60N 2/00* (2006.01)

(52) U.S. Cl.
CPC ............. *G01K 17/00* (2013.01); *G01K 17/20* (2013.01); *G01V 9/005* (2013.01); *B60R 2022/4808* (2013.01); *G01K 2205/00* (2013.01)

BIOLOGICAL OBJECT DETECTOR, VEHICLE SEAT OCCUPANCY DETECTOR, AND SEAT BELT NON-WEARING WARNING SYSTEM

CROSS REFERENCE TO RELATED APPLICATIONS

This application is a divisional Application of U.S. patent application Ser. No. 14/896,005 filed on Dec. 4, 2015 which is a National Stage of International Application No. PCT/JP2014/063709, filed May 23, 2014, which claims priority to Japanese Application No. 2013-220112, filed Oct. 23, 2013 and Japanese Application No. 2013-117754, filed Jun. 4, 2013. The entire disclosures of each of the above applications are incorporated herein by reference.

TECHNICAL FIELD

The present invention relates to a biological object detector using a heat flux sensor, a vehicle seat occupancy detector, and a seat belt non-wearing warning system.

BACKGROUND ART

There are known biological object detectors which sense a temperature by means of an infrared sensor or the like and determine whether or not there is a biological object at a predetermined position, on the basis of the sensed temperature (e.g., see Patent Document 1).

Further, there are known vehicle seat occupancy detectors used for seat belt non-wearing warning systems. Such a seat occupancy detector senses a weight applied to a seating surface of a seat and determines whether or not an occupant is seated on the seat, on the basis of the sensed weight.

PRIOR ART LITERATURE

Patent Literature

Patent Document 1: Japanese Patent No. JP4859926B2

SUMMARY OF THE INVENTION

Problems to be Solved by the Invention

However, when a known biological object detector as mentioned above is used, there is a probability of incorrectly detecting a physical object as a biological object. Specifically, when a physical object of a high temperature is present at a predetermined position, the sensed temperature exceeds a predetermined temperature and thus the physical object of the high temperature is erroneously detected as a biological object. Moreover, when a vehicle seat occupancy detector as mentioned above is used, there is a probability of erroneously detecting a physical object as an occupant. Specifically, when a heavy physical object is placed on a seat, the sensed weight exceeds a predetermined weight and thus the heavy physical object is erroneously detected as an occupant.

The present invention has been made in view of the above problems and mainly aims to realize accurate detection of a biological object.

Means for Solving the Problems

A biological object detector according to the present invention includes a heat flux sensor and a determining means. The heat flux sensor is installed in a place where heat flux emanating from a biological object present at a predetermined position is detectable. The determining means determines whether or not a biological object is present at the predetermined position by comparing sensing results of the heat flux sensor with determination criteria. The determination criteria are preset according to heat flux that can be sensed when a biological object is present at the predetermined position.

A vehicle seat occupancy detector according to the present invention includes a heat flux sensor and a seat occupancy determining means. The heat flux sensor is installed in a place in a vehicle seat where heat flux emanating from an occupant seated on the seat is detectable. The seat occupancy determining means determines whether or not an occupant is seated on the vehicle seat by comparing sensing results of the heat flux sensor with determination criteria. The determination criteria are preset according to heat flux that can be sensed when an occupant is seated on the vehicle seat.

In general, the sensing results of a heat flux sensor differ between when heat flux emanating from a biological object is sensed and when heat flux emanating from a physical object is sensed. For example, when heat flux emanating from a biological object is compared with heat flux emanating from a physical object of a high temperature, there are differences in the heat flux magnitude, the heat flux change with time and the like.

Therefore, the biological object detector and the vehicle seat occupancy detector according to the present invention each make a determination on the basis of a comparison between sensing results of the heat flux sensor and determination criteria, thereby accurately detecting the presence of a biological object or an occupant.

In the biological object detector and the vehicle seat occupancy detector according to the present invention, the heat flux sensor has a structure in which a plurality of first and second via holes are formed in an insulating base member made of a thermoplastic resin so as to penetrate the insulating base member in a thickness direction thereof, first and second connecting members formed of different metals are respectively embedded in the first and second via holes, and the first and second connecting members are alternately connected in series. Further, at least one of the metals forming the first and second connecting members is a sintered alloy obtained by sintering a plurality of metal atoms in a state of maintaining a crystal structure of the metal atoms. As a result, it is possible to increase an electromotive force generated in the first and second connecting members that are alternately connected in series, thereby ensuring high sensitivity of the heat flux sensor.

Accordingly, with the use of the highly-sensitive heat flux sensor, the biological object detector and the vehicle seat occupancy detector according to the present invention are capable of more accurately detecting the presence of a biological object or an occupant.

Reference signs in parentheses of respective means recited in the claims of the present invention show correlation with the specific means in embodiments described below.

DESCRIPTION OF EMBODIMENTS

Hereinafter, embodiments of the present invention will be described with reference to the drawings. In addition, in the following embodiments, identical reference signs are assigned to mutually identical or equivalent components.

First Embodiment

In the present embodiment, a biological object detector of the present invention is applied to a vehicle seat occupancy detector used for a seat belt non-wearing warning system. In the present embodiment, a seat belt non-wearing warning system for a front passenger seat of a vehicle will be described.

Figure 1:
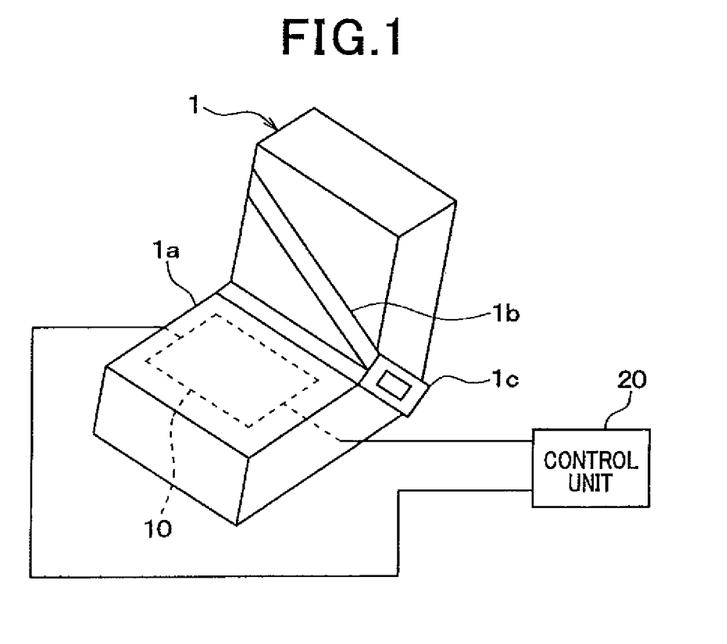
FIG. 1 is a schematic diagram illustrating a configuration of a vehicle seat occupancy detector according to a first embodiment.

As shown in FIG. 1, the seat belt non-wearing warning system mainly includes a heat flux sensor 10 provided in a vehicle seat 1, a control unit 20, a seat belt buckle switch 1c, and an indicator lamp and a buzzer both of which are not shown.

Figure 2:
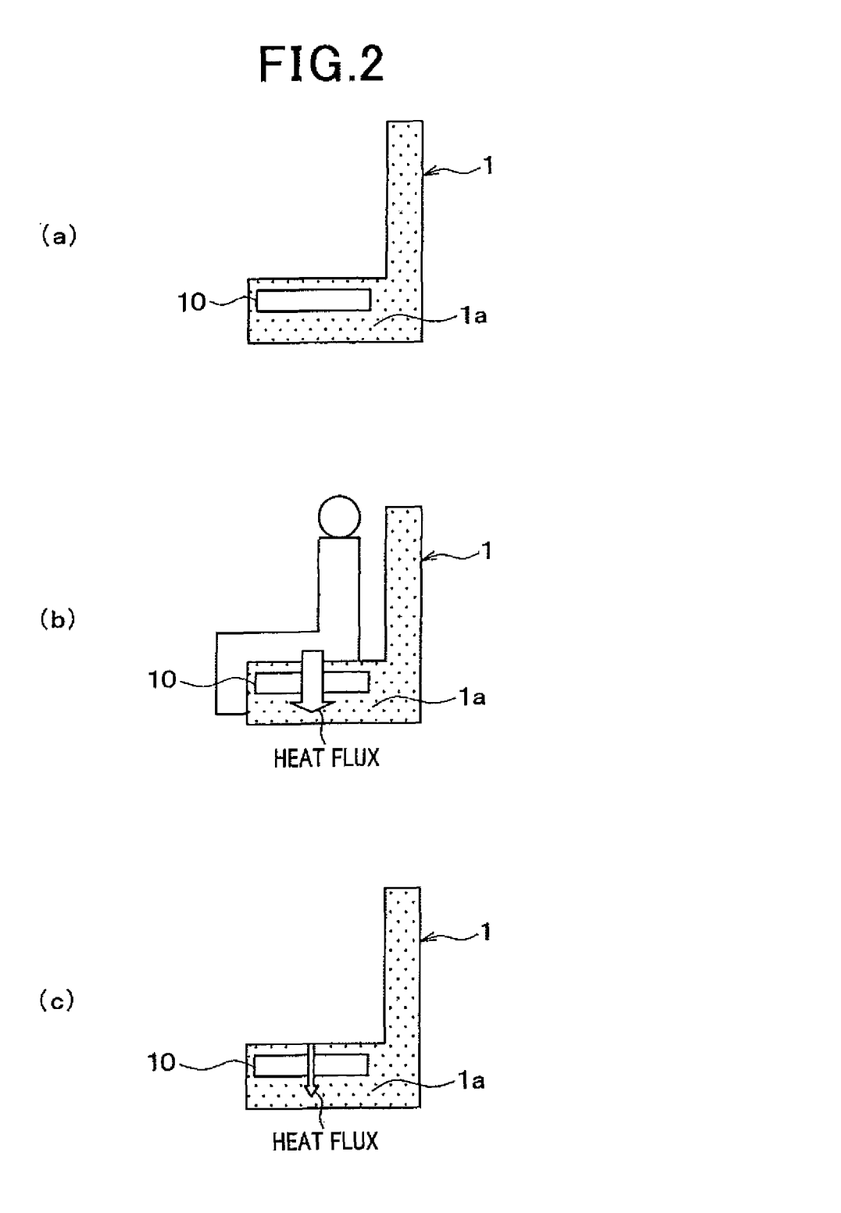
FIG. 2 includes schematic diagrams of a vehicle seat 1 of FIG. 1, where (a) illustrates a state before occupant's seating, (b) illustrates a state during occupant's seating, and (c) illustrates a state after occupant's seating and leaving the seat.

As shown in FIG. 2(a), the heat flux sensor 10 is installed inside a seat portion 1a of the vehicle seat portion 1. As shown in FIG. 2(b), the heat flux sensor 10 senses heat flux passing through the heat flux sensor 10 in the thickness direction thereof. When an occupant is seated on the vehicle seat 1, the heat flux sensor 10 senses the heat flux emanating from the occupant toward the seat portion 1a. In this way, the heat flux sensor 10 is disposed at a position where it is possible to sense the heat flux emanating from the buttocks of the occupant seated on the vehicle seat 1 toward the inside of the seat portion 1a.

Figure 3:
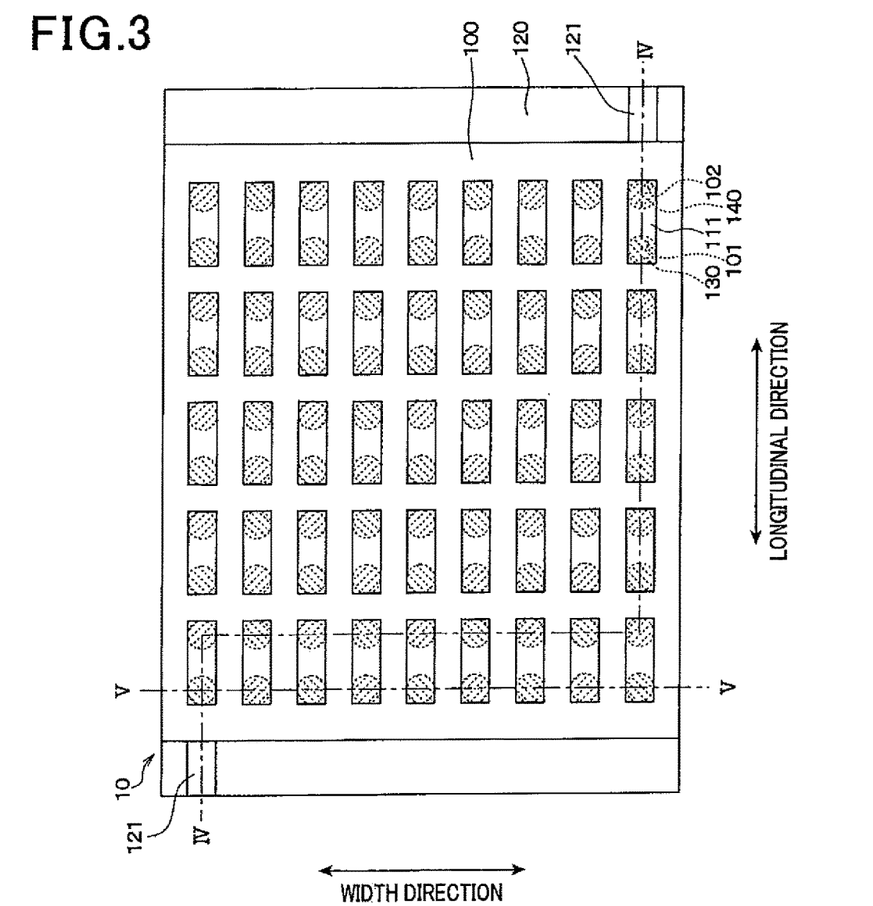
FIG. 3 is a plan view of a heat flux sensor of FIG. 1.
Figure 4:
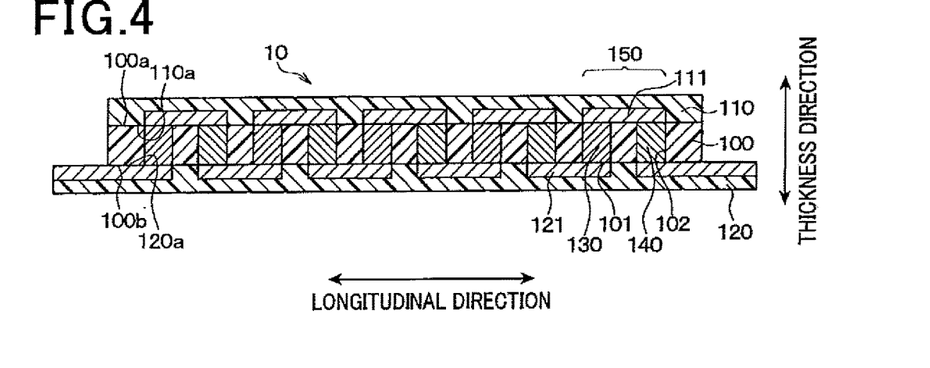
FIG. 4 is a cross-sectional view taken along the line IV-IV of FIG. 3.
Figure 5:
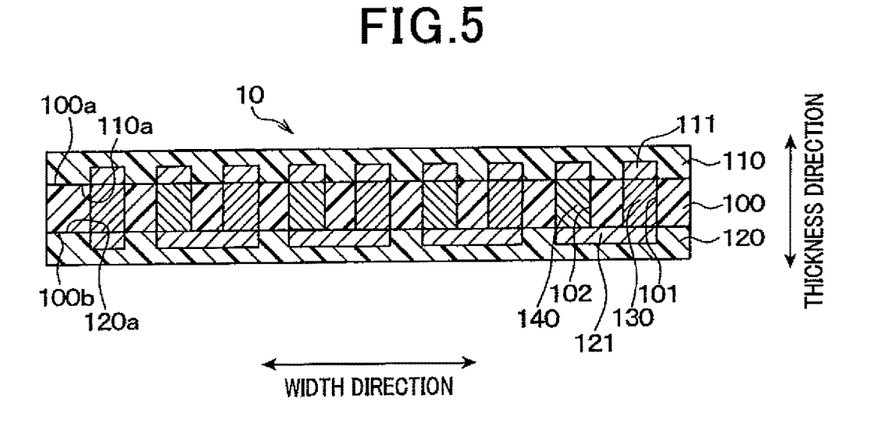
FIG. 5 is a cross-sectional view taken along the line V-V of FIG. 3.

As shown in FIGS. 3-5, the heat flux sensor 10 is an integration of an insulating base member 100, a front surface protective member 110 and a back surface protective member 120. Inside the integrated body, first and second connecting members 130 and 140 are alternately connected in series. Hereinafter, the structure of the heat flux sensor 10 will be described in detail. In addition, for the sake of ease of understanding, the front surface protective member 110 is omitted from FIG. 3. Moreover, though FIG. 3 is not a cross-sectional view, the first and second connecting members 130 and 140 are hatched for the sake of ease of understanding.

In the present embodiment, the insulating base member 100 is constituted of a planar rectangular film of thermoplastic resin such as polyether ether ketone (PEEK), polyether imide (PEI) or a liquid crystal polymer (LCP). The insulating base member 100 is formed in a staggered pattern to alternately arrange a plurality of first and second via holes 101 and 102 penetrating therethrough in the thickness direction.

In addition, in the present embodiment, the first and second via holes 101 and 102 are each formed into a cylindrical shape to have a constant diameter from a front surface 100a to a back surface 100b of the insulating base member 100. Alternatively, these via holes may be each formed into a tapered shape whose diameter decreases from the front surface 100a to the back surface 100b. In contrast, these via holes may be each formed into a tapered shape whose diameter decreases from the back surface 100b to the front surface 100a. Otherwise, these via holes may be each formed into a rectangular cylindrical shape.

The first via holes 101 have the respective first connecting members 130 arranged therein, while the second via holes 102 have the respective second connecting members 140 arranged therein. That is, the first and second connecting members 130 and 140 are alternately arranged in the insulating base member 100.

As above, the first and second connecting members 130 and 140 are respectively arranged in the first and second via holes 101 and 102. Therefore, it is possible to arrange the first and second connecting members 130 and 140 at a high density by suitably setting the number, size and intervals of the first and second via holes 101 and 102. As a result, it is possible to increase the electromotive voltage, thereby ensuring high sensitivity of the heat flux sensor 10.

The first connecting members 130 and the second connecting members 140 are formed of different metals to exhibit the Seebeck effect. For example, the first connecting members 130 are each formed of a metal compound; the metal compound is obtained by solid-phase sintering a Bi—Sb—Te alloy powder for constituting a P-type semiconductor so as to maintain the crystal structure of a plurality of metal atoms before the sintering. The second connecting members 140 are each formed of a metal compound; the metal compound is obtained by solid-phase sintering a Bi—Te alloy powder for constituting an N-type semiconductor so as to maintain the crystal structure of a plurality of metal atoms before the sintering. That is, each of the metals forming the first and second connecting members 130 and 140 is a sintered alloy that is obtained by sintering a plurality of metal atoms with the crystal structure of the metal atoms maintained. Consequently, it is possible to increase the electromotive voltage generated in the first and second connecting members 130 and 140 that are alternately and serially connected, thereby ensuring high sensitivity of the heat flux sensor 10. Thus, in the present embodiment, with the use of the highly-sensitive heat flux sensor, it is possible to accurately detect a biological object.

On the front surface 100a of the insulating base member 100, there is arranged the front surface protective member 110 that is constituted of a planar rectangular film of a thermoplastic resin such as polyether ether ketone (PEEK), polyether imide (PEI) or a liquid crystal polymer (LCP). The planar shape of the front surface protective member 110 has the same size as that of the insulating base member 100. On one surface 110a of the front surface protective member 110 facing the insulating base member 100, there are formed a plurality of front surface patterns 111 so as to be spaced from one another; the front surface patterns 111 are obtained by patterning a copper foil or the like. Moreover, each of the front surface patterns 111 is properly electrically connected to the first and second connecting members 130 and 140.

Specifically, as shown in FIG. 4, taking one first connecting member 130 and one second connecting member 140 adjacent to each other as one pair 150, the first and second connecting members 130 and 140 of each pair 150 are connected to the same front surface pattern 111. That is, the first and second connecting members 130 and 140 of each pair 150 are electrically connected to each other via the front surface pattern 111. In addition, in the present embodiment, one first connecting member 130 and one second connecting member 140 adjacent to each other along the longitudinal direction (right-left direction in FIG. 4) of the insulating base member 100 are taken as one pair 150.

On the back surface 100b of the insulating base member 100, there is arranged the back surface protective member 120 of a planar rectangular shape which is constituted of a film of a thermoplastic resin such as polyether ether ketone (PEEK), polyether imide (PEI) or a liquid crystal polymer (LCP). The back surface protective member 120 has a greater length in the longitudinal direction of the insulating base member 100 than the insulating base member 100. The back surface protective member 120 is arranged on the back surface 100b of the insulating base member 100 so that both end portions of the back surface protective member 120 protrude from the insulating base member 100 in the longitudinal direction.

On one surface 120a of the back surface protective member 120 facing the insulating base member 100, there are formed a plurality of back surface patterns 121 so as to be spaced from one another; the back surface patterns 121 are obtained by patterning a copper foil or the like. Moreover, each of the back surface patterns 121 is properly electrically connected to the first and second connecting members 130 and 140.

Specifically, as shown in FIG. 4, for two pairs 150 adjacent to each other in the longitudinal direction of the insulating base member 100, the first connecting member 130 of one of the two pairs 150 and the second connecting member 140 of the other of the two pairs 150 are connected to the same back surface pattern 121. That is, the first and second connecting members 130 and 140 are electrically connected via the same back surface pattern 121 straddling the pairs 150.

As shown in FIG. 5, at an outer edge of the insulating base member 100, the first and second connecting members 130 and 140 adjacent to each other along a width direction (up-down direction in FIG. 3) perpendicular to the longitudinal direction are connected to the same back surface pattern 121. Specifically, the adjacent first and second connecting members 130 and 140 are connected to the same back surface pattern 121 so that a connection body is folded in the longitudinal direction of the insulating base member 100; the connection body is formed by serially connecting the first and second connecting members 130 and 140 via the front surface patterns 111 and the back surface patterns 121.

At both ends of the connection body that is formed by serially connecting all of the first and second connecting members 130 and 140, there are respectively arranged two back surface patterns 121. As shown in FIGS. 3 and 4, end portions of the two back surface patterns 121 are formed so as to be exposed from the insulating base member 100. These end portions of the back surface patterns 121 function as terminals to be connected to the control unit 20.

The basic configuration of the heat flux sensor 10 according to the present embodiment has so far been described. The heat flux sensor 10 outputs, to the control unit 20, a sensor signal (electromotive voltage) according to the heat flux passing through the heat flux sensor 10 in the thickness direction. A change in the heat flux causes a change in the electromotive voltage generated in the first and second connecting members 130 and 140 that are alternately connected in series. In addition, the thickness direction of the heat flux sensor 10 coincides with the stacking direction of the insulating base member 100, the front surface protective member 110 and the back surface protective member 120.

Figure 6:
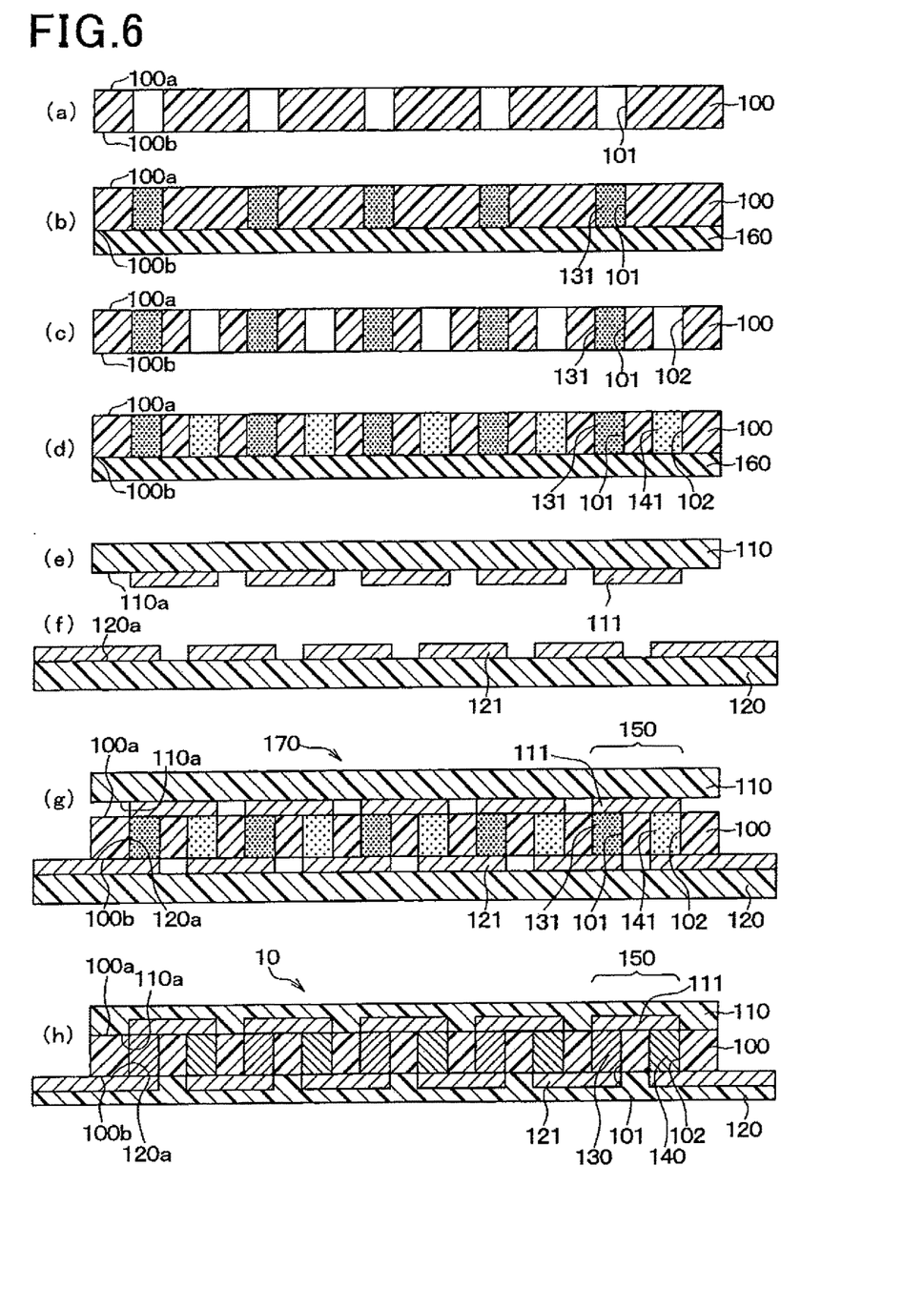
FIG. 6 includes schematic diagrams illustrating manufacturing steps of the heat flux sensor.

With reference to FIG. 6, a method of manufacturing the heat flux sensor 10 will be described.

Firstly, as shown in FIG. 6 (a), the insulating base member 100 is prepared and the plurality of first via holes 101 are formed by means of drilling, a laser, or the like.

Then, as shown in FIG. 6 (b), each of the first via holes 101 is filled with a first electrically-conductive paste 131. As a method (apparatus) for filling the first via holes 101 with the first conductive paste 131, the method (apparatus) described in Japanese Patent Application No. 2010-050356 filed by the present applicant may be used.

As briefly explained below, the insulating base member 100 is placed on a holding table, not shown, via an absorbent paper 160 in such a way that the back surface 100b faces the absorbent paper 160. Then, while the first conductive paste 131 is melted, the first via holes 101 are filled with the first conductive paste 131. Consequently, most of organic solvent in the first conductive paste 131 is absorbed by the absorbent paper 160 to densely arrange the alloy powder in the first via holes 101.

It is only necessary for the absorbent paper 160 to be made from a material capable of absorbing the organic solvent of the first conductive paste 131; ordinary high-quality paper or the like is therefore employed as the absorbent paper 160. The first conductive paste 131 is obtained by adding an organic solvent having a melting point of 43° C., such as paraffin, to powder of a Bi—Sb—Te alloy in which metal atoms maintain a predetermined crystal structure. Therefore, in filling the first conductive paste 131, the front surface 100a of the insulating base member 100 is heated to approximately 43° C.

Next, as shown in FIG. 6 (c), the plurality of second via holes 102 are formed in the insulating base member 100 by means of drilling, a laser, or the like. The second via holes 102 are formed so as to be alternately arranged with the first via holes 101 to make up a staggered pattern together with the first via holes 101 as described above.

Then, as shown in FIG. 6 (d), each of the second via holes 102 is filled with a second conductive paste 141. This step may be performed in a similar manner to the step shown in FIG. 6 (b).

That is, the insulating base member 100 is again placed on the holding table, not shown, via the absorbent paper 160 in such a way that the back surface 100b faces the absorbent paper 160, followed by filling the second via holes 102 with the second conductive paste 141. Consequently, most of organic solvent in the second conductive paste 141 is absorbed by the absorbent paper 160 to densely arrange the alloy powder in the second via holes 102.

The second conductive paste 141 is obtained by adding an organic solvent having a melting point at normal temperature, such as terpineol, to powder of a Bi—Te alloy in which metal atoms different from those constituting the first conductive paste 131 maintain a predetermined crystal structure. That is, as the organic solvent constituting the second conductive paste 141, one having a melting point lower than that of the organic solvent constituting the first conductive paste 131 is used. In filling the second conductive paste 141, the front surface 100a of the insulating base member 100 is kept at normal temperature. In other words, the second conductive paste 141 is filled in in a state where the organic solvent contained in the first conductive paste 131 is solidified. In this way, the second conductive paste 141 is prevented from mixing into the first via holes 101.

In addition, the "state where the organic solvent contained in the first conductive paste 131 is solidified" denotes the organic solvent remaining in the first via holes 101 without being absorbed by the absorbent paper 160 at the step shown in FIG. 6 (b).

At steps separate from the above steps, copper foils or the like are formed, as shown in FIG. 6 (e) and FIG. 6 (f), on those surfaces 110a and 120a of the front surface protective member 110 and the back surface protective member 120 which are to be opposed to the insulating base member 100. Then, the copper foils are properly patterned to prepare the front surface protective member 110 on which the plurality of front surface patterns 111 are formed so as to be spaced from each other, and the back surface protective member 120 on which the plurality of back surface patterns 121 are formed so as to be spaced from each other.

Thereafter, as shown in FIG. 6 (g), the back surface protective member 120, the insulating base member 100, and the front surface protective member 110 are sequentially stacked to constitute a stacked body 170.

In the present embodiment, the back surface protective member 120 has a length in the longitudinal direction greater than that of the insulating base member 100. The back surface protective member 120 is arranged so that both the end portions thereof in the longitudinal direction protrude from the insulating base member 100.

Next, as shown in FIG. 6 (h), the stacked body 170 is placed between a pair of pressing plates, not shown, and pressed from both the upper and lower sides in the stacking direction while being heated in a vacuum state, thereby being integrated. Specifically, in the integration of the stacked body 170, the first and second conductive pastes 131 and 141 are solid-phase sintered to form the first and second connecting members 130 and 140, and the first and second connecting members 130 and 140 are connected to the front surface patterns 111 and the back surface patterns 121 while being heated and pressed.

Although not particularly limited, in integrating the stacked body 170, a cushion material, such as rock wool paper, may be placed between the stacked body 170 and the pressing plates. As above, the heat flux sensor 10 is manufactured.

The seat belt buckle switch 1c is a detecting means that detects a non-wearing state of a seat belt 1b. The seat belt buckle switch 1c is turned on when the seat belt 1b is worn and outputs a switch signal to the control unit 20. An indicator lamp and a buzzer are notifying means for notifying an occupant when the seat belt 1b is not worn.

The control unit 20 is an electronic control unit configured with, for example, a microcomputer, a memory as a storing means, and the peripheral circuits. The control unit 20 performs predetermined arithmetic processing in accordance with a preset program to control the activation of the indicator lamp and the buzzer.

Figure 7:
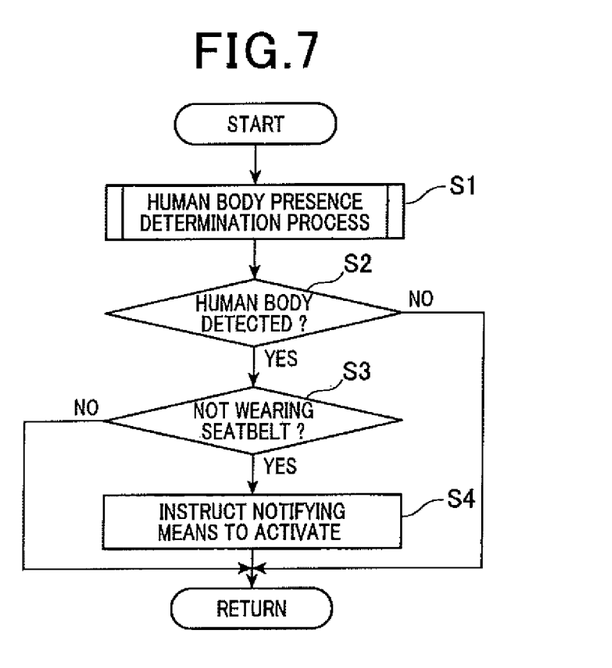
FIG. 7 is a flow chart illustrating a control process performed by a control unit 20 of FIG. 1.

Specifically, the control unit 20 performs a control process illustrated in FIG. 7. The control process is performed when an ignition switch or an engine start switch is turned on or a vehicle is traveling at a predetermined speed or higher. The control process is repeated at predetermined time intervals. The control steps shown in FIG. 7 constitute various function-realizing means provided in the control unit 20.

First, the control unit 20 performs a human body presence determination process that determines the presence of an occupant (human body) seated on the vehicle seat 1 (step S1). Step S1 corresponds to the determining means and the seat occupancy determining means recited in the claims of the present invention. Details of the process will be described later.

Then, if an occupant is seated on the vehicle seat 1 and thus it is determined in the human body presence determination process that a human body is present, in other words, if a human body is detected, it is further determined whether or not the occupant is wearing the seat belt (steps S2 and S3). The determination is made on the basis of a switch signal outputted from the seat belt buckle switch 1c. Step S3 corresponds to the seat belt wearing determining means recited in the claims of the present invention.

On the other hand, if no occupant is seated on the vehicle seat 1 and thus it is determined in the human body presence determination process that no human body is present, in other words, if no human body is detected, the process is terminated without performing steps S3 and S4. Then, the control process shown in FIG. 7 is iterated.

If it is determined that the occupant is not wearing the seat belt 1b, an activation instruction signal is outputted to the notifying means to warn the occupant of the non-wearing of the seat belt (step S4). Specifically, the buzzer generates a warning sound and the indicator lamp is lit or blinked. Step S4 corresponds to the warning means recited in the claims of the present invention. On the other hand, if it is determined that the occupant is wearing the seat belt 1b, the process is terminated without performing step S4. Then, the control process shown in FIG. 7 is iterated.

As above, in the present system, if an occupant is seated on the vehicle seat 1 but the occupant is not wearing the seat belt 1b, the occupant is warned accordingly by the notifying means.

Next, the human body presence determination process performed at step S1 will be described.

Figure 8:
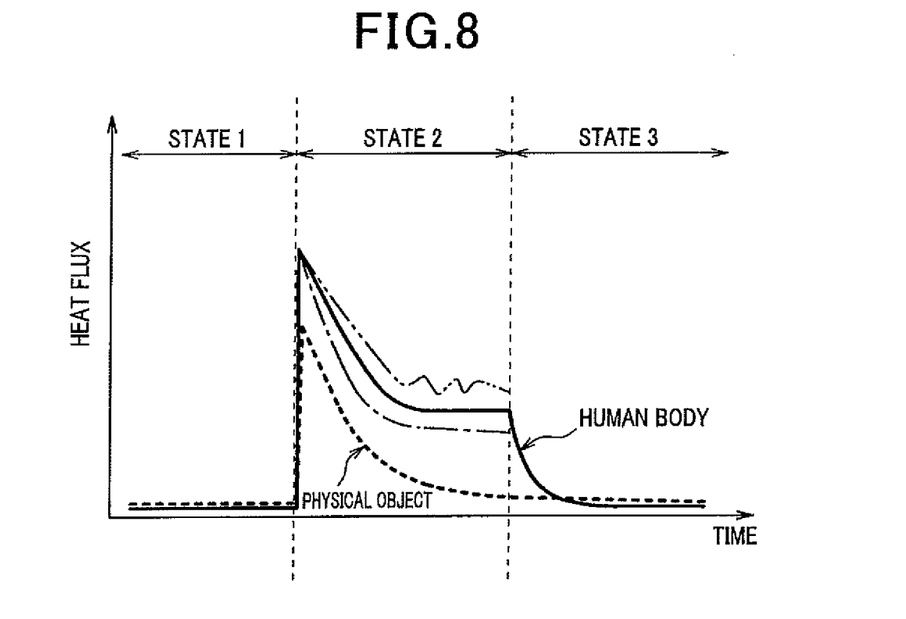
FIG. 8 is a schematic diagram illustrating the relationship between heat flux flowing through the vehicle seat 1 and time, in each state where the vehicle seat 1 is yet to be seated (state 1), currently seated (state 2), and vacant after being seated (state 3) by an occupant.

First, referring to FIG. 8, heat flux detected by the heat flux sensor 10 is described in terms of the states before, during and after the occupant's seating on the vehicle seat 1. States 1, 2, and 3 in FIG. 8 correspond, respectively, to the state before the occupant's seating as shown in FIG. 2 (a), the state during the occupant's seating as shown in FIG. 2 (b), and the state after the occupant's seating and leaving the seat as shown in FIG. 2 (c). FIG. 8 shows the case where the body temperature of the occupant is higher than the temperature of the vehicle seat 1.

As indicated by the solid line in FIG. 8, no heat flux will be detected, or heat flux is close to zero in the state 1 before the occupant's seating. In the state 2 during the occupant's seating, heat flux is detected immediately after seating and the detected heat flux decreases with time. In this case, since a human body constantly generates heat, heat flux does not become zero and thus heat flux is constantly detected. The detected heat flux has a substantially constant magnitude. In the state 3 after the occupant's seating and leaving the seat, a small amount of heat from the human body is left on the seat surface from which the heat flux is detected but the detected heat flux decreases with time and becomes close to zero.

In contrast, when a physical object temporarily having a high temperature is placed on the vehicle seat 1, the heat flux emanating from the physical object decreases with time towards zero, as indicated by the broken line in FIG. 8, immediately after being placed on the vehicle seat 1. In this case, when the temperature of the physical object is different from the temperature of a human body, the magnitude of the detected heat flux is different from the heat flux emanating from the human body. When the thermal conductivity is different between the physical object and the human body, the rate of change (gradient) of heat flux with time will be different.

Thus, comparing the heat flux emanating from a human body with the heat flux emanating from a physical object of a high temperature, the magnitudes of the heat fluxes and the changes with time of the heat fluxes are different.

Therefore, in the human body presence determination process of step S1, it is determined whether or not the detected heat flux is the heat flux emanating from a biological object, and if the detected heat flux is the heat flux emanating from a biological object, it is determined that there is a human body. In other words, the sensing results of the heat flux sensor 10 are compared with determination criteria preset according to the heat flux that can be detected when an occupant is seated on the vehicle seat 1. As a result of the comparison, if the sensing results satisfy the determination criteria, it is determined that a human body is present.

For example, as the sensing results of the heat flux sensor 10, a tendency of change in heat flux with time is determined on the basis of the sensor signal intermittently or continuously inputted from the heat flux sensor 10. The tendency of change in heat flux referred to herein is a curve indicating the change of heat flux as shown in FIG. 8. On the other hand, as the determination criteria, a map is used which indicates a range of heat flux variation with time in the case where an occupant is seated. The map is prepared in advance by experiments or the like.

In addition, as indicated by the one-dot chain line and the two-dot chain line in FIG. 8, the heat fluxes from human bodies vary depending on individuals; the heat flux from the same individual also varies depending on the health condition of the individual. In consideration of the above, the determination criteria used for determination of the presence or absence of a human body is set. If there is a match between the obtained tendency of change in heat flux and the map, it is determined that a human body is present on the vehicle seat 1.

Figure 10:
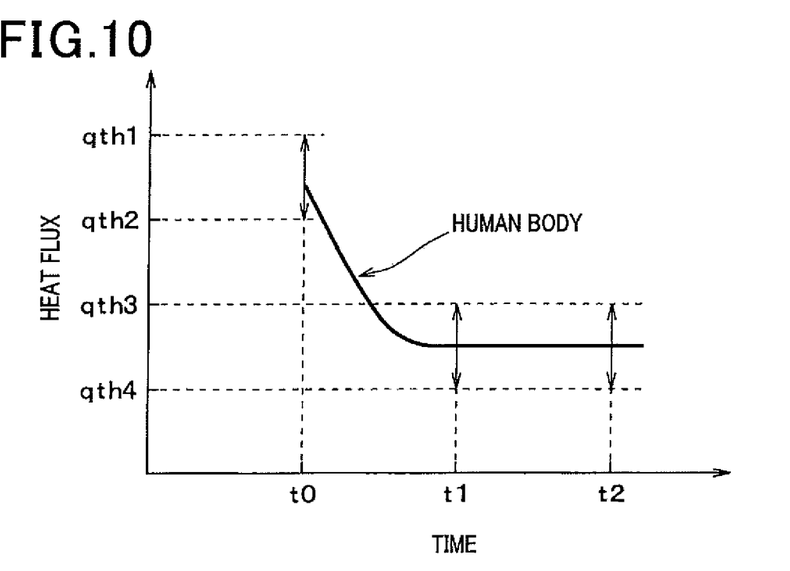
FIG. 10 is a schematic diagram illustrating a first threshold qth1, a second threshold qth2, a third threshold qth3 and a fourth threshold qth4 of FIG. 9.

Moreover, for example, as the sensing results of the heat flux sensor 10, the heat flux is calculated immediately after the start of the heat flux detection (time instant t0) and after first and second predetermined times from the start of the heat flux detection (time instants t1, t2) on the basis of the sensor signal intermittently or continuously inputted from the heat flux sensor 10. On the other hand, as the determination criteria, as shown in FIG. 10, ranges of possible values of the heat flux in the case where an occupant is seated on the vehicle seat 1 are used. These ranges are respectively determined immediately after the start of the heat flux detection (time instant t0) and after the first and second predetermined times from the start of the heat flux detection (time instants t1, t2).

Here, the determination criteria shown in FIG. 10 is described. The curve indicated by the solid line in FIG. 10 corresponds to the state 2 indicated by the solid line in FIG. 8. In the case where an occupant is seated, the time instant immediately after the start of the heat flux detection is denoted by t0, and the time instants after the first and second predetermined times from the start of the heat flux detection are respectively denoted by t1 and t2. In the case where an occupant is seated, the time instants after the first and second predetermined times correspond to the time period during which the heat flux sensed by the heat flux sensor 10 becomes substantially constant after being lowered from the value immediately after the start of the detection. Moreover, a first range of the heat flux detectable at the time instant t0 is set to be not higher than qth1 and not lower than qth2; a second range of the heat flux detectable at the time instants t1 and t0 is set to be not higher than qth3 and not lower than qth4. In addition, as indicated by the one-dot chain line and the two-dot chain line in FIG. 8, the heat fluxes from human bodies vary depending on individuals; the heat flux from the same individual also varies depending on the health condition of the individual. In consideration of the above, the first and second ranges are set.

Figure 9:
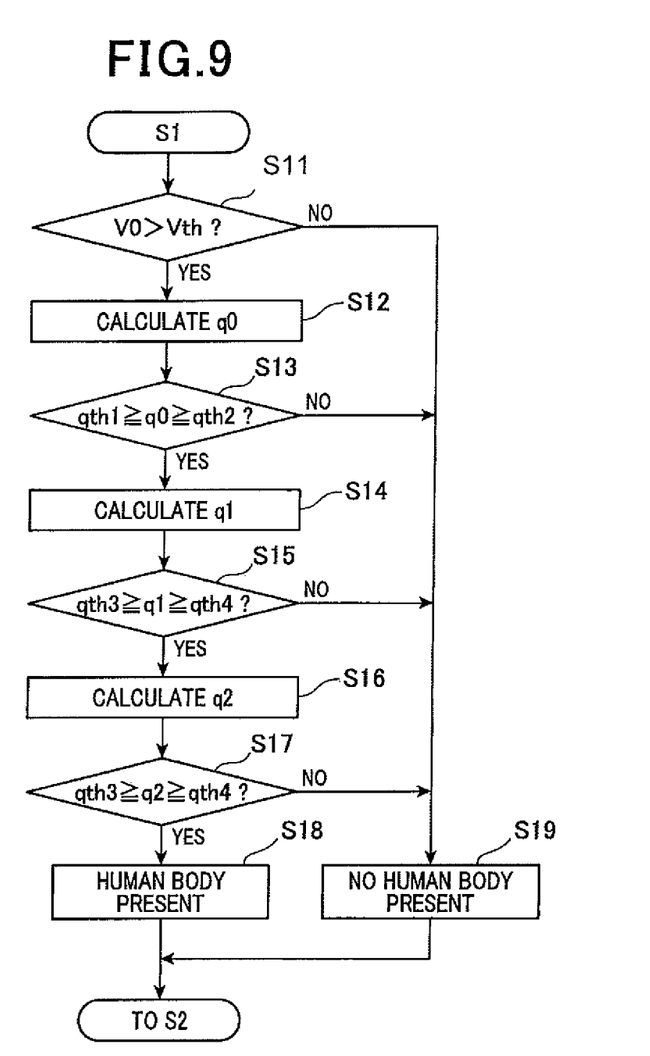
FIG. 9 is a flow chart illustrating a human body presence determination process of FIG. 7.

Using the determination criteria shown in FIG. 10, the control unit 20 performs the control process shown in FIG. 9. The control steps shown in FIG. 9 constitutes various function-realizing means provided in the control unit 2.

At step S11, the sensor signal (voltage value) outputted from the heat flux sensor 10 is read in, and it is determined whether or not the voltage value V0 is higher than a threshold Vth. By this, it is determined whether or not heat flux has been sensed by the heat flux sensor 10. If an occupant is seated on the vehicle seat 1 or a physical object of a high temperature is placed on the vehicle seat 1, an electromotive voltage is generated in the heat flux sensor 10. In this case, the control unit 20 makes an affirmative determination (YES) and the process proceeds to step S12. On the other hand, if neither an occupant is seated on the vehicle seat 1, nor a physical object of a high temperature is placed on the vehicle seat 1, no electromotive voltage is generated in the heat flux sensor 10. In this case, the control unit 2 makes a negative determination (NO) and the process proceeds to step S19. At step S19, it is determined that no human body is present; then the process proceeds to step S2.

At step S12, the heat flux is calculated on the basis of the voltage value V0 read in at step S11. The heat flux at this time is taken as the heat flux q0 at the time instant t0.

Next, at step S13, it is determined whether or not the heat flux q0 is within the first range. That is, it is determined whether or not the heat flux q0 is not higher than the first threshold qth1 and not lower than the second threshold qth2 ($qth1 \geq q0 \geq qth2$). If the heat flux q0 is out of the first range, it means that no occupant is seated on the vehicle seat 1. Accordingly, a negative determination is made (NO) at step S13, and the process proceeds to step S19. At step S19, it is determined that no human body is present; then the process proceeds to step S2. On the other hand, if an affirmative determination is made (YES) at step S13, the process proceeds to step S14.

At step S14, the sensor signal is read in at the time instant t1 after the elapse of the first predetermined time from the time instant t0. On the basis of the read-in sensor signal, the heat flux q1 at the time instant t1 is calculated.

Next, at step S15, it is determined whether or not the heat flux q1 is within the second range. That is, it is determined whether or not the heat flux q1 is not higher than the third threshold qth3 and not lower than the fourth threshold qth4 ($qth3 \geq q1 \geq qth4$). If the heat flux q1 is out of the second range, it means that no occupant is seated on the vehicle seat 1. Accordingly, a negative determination is made (NO) at step S15, and the process proceeds to step S19. At step S19, it is determined that no human body is present; then the process proceeds to step S2. On the other hand, if an affirmative determination is made (YES) at step S15, the process proceeds to step S16.

At step S16, the sensor signal is read in at the time instant t2 after the elapse of the second predetermined time from the time instant t0. On the basis of the read-in sensor signal, the heat flux q2 at the time instant t2 is calculated.

Next, at step S17, it is determined whether or not the heat flux q2 is within the second range. That is, it is determined whether or not the heat flux q2 is not higher than the third threshold qth3 and not lower than the fourth threshold qth4 (qth3≥q2≥qth4). The second range is the same as the one used at step S15. This is because, as shown in FIG. 10, if an occupant is seated on the vehicle seat 1, the magnitude of the heat flux becomes substantially constant at a predetermined magnitude after the elapse of a predetermined time from the start of the seating. Accordingly, if the heat flux q2 is within the second range, it is understood that an occupant is seated on the vehicle seat 1. If the heat flux q2 is out of the second range, it is understood that no occupant is seated on the vehicle seat portion 1. Accordingly, if a negative determination is made (NO) at step S17, the process proceeds to step S19. At step S19, it is determined that no human body is present; then the process proceeds to step S2. On the other hand, if an affirmative determination is made (YES) at step S17, the process proceeds to step S18. At step S18, it is determined that a human body is present; then the process proceeds to step S2.

As described above, according to the present embodiment, it is possible to prevent a physical object of a high temperature from being erroneously detected as a human body; thus it is possible to realize accurate detection of a human body. In addition, the magnitude of the heat flux sensed when an occupant is seated on the vehicle seat 1 varies depending on the temperature of the vehicle seat 1. Therefore, it is preferable to change the determination criteria in accordance with the temperature of the vehicle seat 1.

In the heat flux sensor 10 of the present embodiment, the insulating base member 100, the front surface protective member 110, and the back surface protective member 120 are each made of a thermoplastic resin and thus have flexibility. If a heat flux sensor without flexibility was installed in the vehicle seat 1, unlike in the present embodiment, sitting comfort would be impaired. In contrast, since the heat flux sensor 10 of the present embodiment has flexibility, sitting comfort is not impaired.

Second Embodiment

In the present embodiment, a biological object detector of the present invention is applied to an abnormal health condition detecting system. The abnormality detecting system is configured to externally notify when the health conditions of a human body at home are determined to be abnormal.

Figure 11:
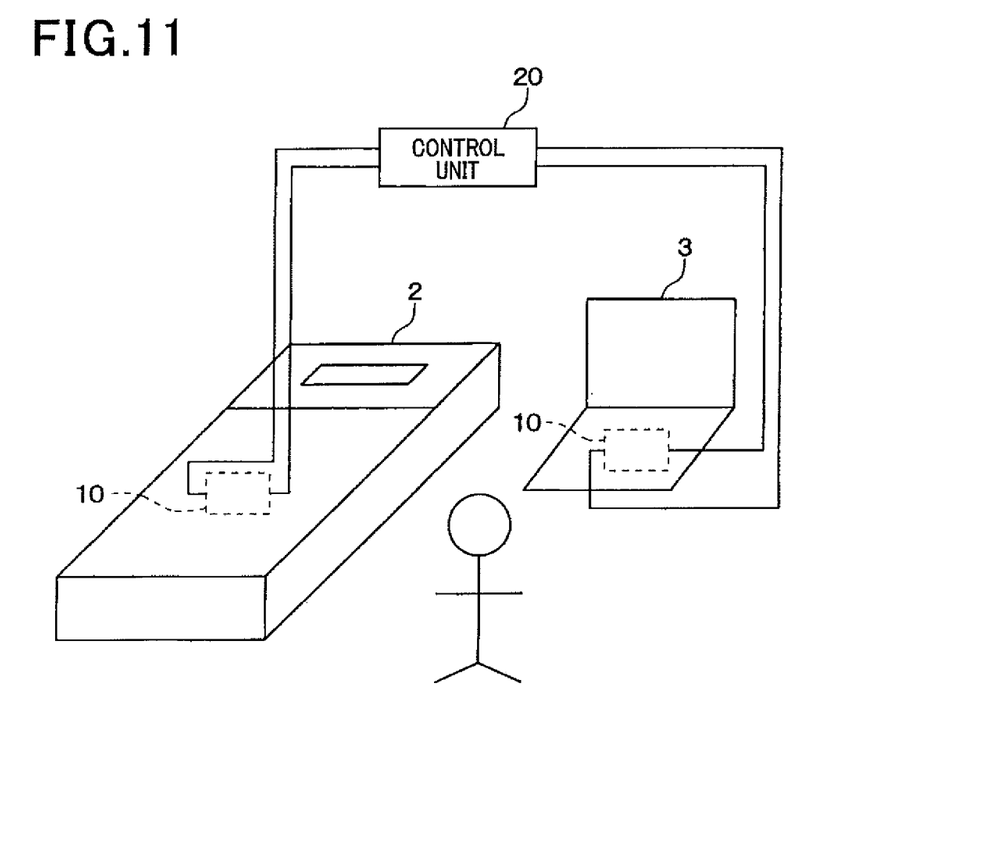
FIG. 11 is a schematic diagram illustrating the configuration of an abnormal health condition detecting system according to a second embodiment.

As shown in FIG. 11, the abnormality detecting system mainly includes a plurality of heat flux sensors 10, a control unit 20, and a notifying means, not shown.

The heat flux sensors 10 each have the same configuration as that of the first embodiment. The heat flux sensors 10 are installed in respective physical objects, including a bed 2 and a legless chair 3, which come into contact with a person in the daily life of the person at home. Although not shown, the physical objects coming into contact with a person may include, besides the bed 2 and the legless chair 3, a cushion, a door knob, a toilet seat and the like. The heat flux sensors 10 each senses the heat flux emanating from a human body when the human body is located at a predetermined position, i.e. at the bed 2, the legless chair 3 or the like. Each heat flux sensor 10 outputs, to the control unit 20, a sensor signal according to the heat flux.

The control unit 20 performs a human body presence determination process similar to the one in the first embodiment for each of the plurality of heat flux sensors 10 to determine the presence of a human body at the spot where the heat flux sensor 10 is installed. Then, on the basis of the determination results of each heat flux sensor 10, it is determined whether or not the health condition of a target person is abnormal. As a result, if the health condition is determined to be abnormal, the notifying means is activated. For example, the notifying means is a communication device that externally transmits an e-mail notifying that the health condition of the target person is abnormal.

When the target person is healthy, the person moves around at home and thus a human body is detected by the respective heat flux sensors 10. In contrast, when the health condition of the target person is abnormal, such as when the person becomes unable to leave the bed 2 or falls down on the floor, the person cannot move around at home. Therefore, only the heat flux sensor 10 installed in the bed 2 can detect a human body, or none of the heat flux sensors 10 can detect a human body.

Accordingly, the control unit 20 determines, for example, whether or not the number of the heat flux sensors 10 having sensed a human body is one or less. When the number of the heat flux sensors 10 having sensed a human body is one or zero and this situation continues for a predetermined period of time, it is determined that abnormality has occurred. In this way, when the health condition of a human body at home is abnormal, the situation can be externally notified accordingly.

In the present embodiment, the human body presence determination process similar to that in the first embodiment is performed. Consequently, it is possible to prevent a physical object of a high temperature from being erroneously detected as a human body; thus it is possible to realize accurate detection of a human body.

Moreover, the heat flux sensors 10 of the present embodiment each include the insulating base member 100, the front surface protective member 110 and the back surface protective member 120, which are each made of a thermoplastic resin. Thus, the heat flux sensors 10 of the present embodiment have flexibility. Therefore, the heat flux sensors 10 each can be suitably deformed in conformity with the shape of the installation location and thus can be installed in a variety of places at home.

Other Embodiments

Some embodiments of the present invention have been described above. However, the present invention should not be construed as being limited to the above embodiments but may be implemented in various modes within the scope not departing from the spirit of the present invention.

(1) In the first embodiment, the heat flux sensor 10 is installed in the seat portion 1a of the vehicle seat 1. Alternatively, the heat flux sensor 10 may be installed in a backrest of the vehicle seat 1 as long as the heat flux from a seated occupant to the vehicle seat 1 can be sensed.

(2) In the first embodiment, the biological object detector of the present invention is applied to the seat occupancy detector used in the seat belt non-wearing warning system. Alternatively, the biological object detector may be applied to another vehicle seat occupancy detector which is used in, for example, a vehicle air conditioner to selectively blow conditioning air toward the seat on which an occupant is seated.

(3) In the embodiments described above, the presence of a human body is determined on the basis of the heat flux sensed by the heat flux sensor 10. However, the sensed heat flux may be used for determining the conditions of a human body. Specifically, as shown in FIG. 8, the heat flux sensed from a human body exhibits different tendencies of change in a normal steady state (the solid line in FIG. 8) and in other states (the one-dot chain line and the two-dot chain line in FIG. 8).

The change in heat flux of a target person in a steady state is investigated in advance, and the tendency of the investigated change is used as determination criteria. Comparing the tendency of change in heat flux sensed by the heat flux sensor 10 with the determination criteria, the life/death state, the illness state and the drowsiness state of the target person can be detected.

(4) In the embodiments described above, the cases of detecting a human body have been described. However, biological objects other than human bodies, such as pets represented by dogs and cats, can be detected as well.

(5) In the embodiments described above, the place where the heat flux sensor is installed is an object making contact with a biological object. However, the place where the heat flux sensor is installed is not limited to an object making contact with a biological object, but may be a place away from a biological object as long as the heat flux emanating from the biological object can be sensed in that place.

(6) In the embodiments described above, the heat flux is calculated by the control unit 20 on the basis of the electromotive voltage (voltage value) generated in the heat flux sensor 10. Alternatively, the heat flux may be calculated on the basis of the current (current value) generated in the heat flux sensor 10. In short, the control unit 20 is capable of detecting the heat flux on the basis of the electromotive force generated in the heat flux sensor 10.

(7) As the sensing results of the heat flux sensor 10, the above embodiments describe an example of using the tendency of change in heat flux with time, and an example of using the heat flux immediately after the start of the heat flux detection (t0) and after the first and second predetermined times from the start of the heat flux detection (t1 and t2). Alternatively, a voltage value or a current value of the electric power generated in the heat flux sensor 10 may be used instead of the heat flux.

(8) In the embodiments described above, the metals forming the first and second connecting members 130 and 140 are a Bi—Sb—Te alloy and a Bi—Te alloy, respectively. However, other alloys may also be used. Further, in the embodiments described above, both the metals forming the first and second connecting members 130 and 140 are sintered alloys obtained by solid-phase sintering. Alternatively, at least one of the metals may be a sintered alloy obtained by solid-phase sintering. Thus, the electromotive force can be increased and the heat flux sensor 10 can have higher sensitivity, compared to the case where neither of the metals forming the first and second connecting members 130 and 140 is solid-phase sintered.

(9) The embodiments described above are relevant to each other and thus can be combined appropriately, unless the combination is obviously impossible. As a matter of course, in the embodiments described above, the components constituting the embodiments should not be construed as being necessarily essential, unless explicitly indicated as being essential or unless obviously considered to be essential in principle.

DESCRIPTION OF REFERENCE SIGNS

10 Heat flux sensor
20 Control unit
100 Insulating base member
101, 102 First and second via holes
130, 140 First and second connecting members

What is claimed is:

1. A seat belt non-wearing warning system comprising:
a vehicle seat occupancy detector including a heat flux sensor installed in a place in a vehicle seat where heat flux emanating from an occupant seated on the vehicle seat is detectable, and a seat occupancy determining means for determining whether or not an occupant is seated on the vehicle seat;
a seat belt wearing determining means for determining, when it is determined by the seat occupancy determining means of the vehicle seat occupancy detector that an occupant is seated on the vehicle seat, whether or not the occupant is wearing a seat belt; and
a warning means for warning, when it is determined by the seat belt wearing determining means that the occupant is not wearing the seat belt, the occupant of the non-wearing of the seat belt,
wherein
the heat flux sensor of the vehicle seat occupancy detector has a structure in which a plurality of first and second via holes are formed in an insulating base member made of a thermoplastic resin so as to penetrate the insulating base member in a thickness direction thereof, first and second connecting members formed of different metals are respectively embedded in the first and second via holes, and the first and second connecting members are alternately connected in series,
at least one of the metals forming the first and second connecting members is a sintered alloy obtained by sintering a plurality of metal atoms in a state of maintaining a crystal structure of the metal atoms, and
the seat occupancy determining means of the vehicle seat occupancy detector determines whether or not an occupant is seated on the vehicle seat by comparing sensing results of the heat flux sensor with determination criteria, the determination criteria being preset according to heat flux that can be sensed when an occupant is seated on the vehicle seat.

2. The seat belt non-wearing warning system as set forth in claim 1, wherein the sintered alloy is obtained by solid-phase sintering a plurality of metal atoms in a state of maintaining a crystal structure of the metal atoms.

3. The seat belt non-wearing warning system as set forth in claim 1, further comprising a seat belt buckle switch configured to output a switch signal indicative of whether or not the seat belt is worn, wherein the seat belt wearing determining means determines whether or not the occupant is wearing the seat belt based on the switch signal outputted from the seat belt buckle switch.

* * * * *